(12) United States Patent
Gourley et al.

(10) Patent No.: US 10,572,675 B2
(45) Date of Patent: Feb. 25, 2020

(54) PROTECTING AND MONITORING INTERNAL BUS TRANSACTIONS

(71) Applicant: Cisco Technology, Inc., San Jose, CA (US)

(72) Inventors: Christopher S. Gourley, Sweetwater, TN (US); Jed Eaton, Knoxville, TN (US); Ronald L. Shaffer, II, Knoxville, TN (US); Yousef S. Iskander, Knoxville, TN (US)

(73) Assignee: Cisco Technology, Inc., San Jose, CA (US)

( * ) Notice: Subject to any disclaimer, the term of this patent is extended or adjusted under 35 U.S.C. 154(b) by 383 days.

(21) Appl. No.: 15/341,128

(22) Filed: Nov. 2, 2016

(65) Prior Publication Data

US 2018/0121664 A1    May 3, 2018

(51) Int. Cl.
*G06F 21/62* (2013.01)
*G06F 21/85* (2013.01)
*H04L 29/06* (2006.01)

(52) U.S. Cl.
CPC .............. *G06F 21/62* (2013.01); *G06F 21/85* (2013.01); *H04L 63/10* (2013.01); *H04L 63/108* (2013.01); *H04L 63/20* (2013.01)

(58) Field of Classification Search
CPC .......... G06F 21/62; G06F 21/85; G06F 21/53; G06F 21/6218; G06F 21/604; H04L 63/108; H04L 63/10; H04L 63/20
See application file for complete search history.

(56) References Cited

U.S. PATENT DOCUMENTS

| | | |
|---|---|---|
| 5,751,736 A | 5/1998 | Deroux-Dauphin et al. |
| 6,425,094 B1 | 7/2002 | Drogichen et al. |
| 7,010,688 B1 | 3/2006 | Kawasaki |
| 7,143,294 B1 | 11/2006 | Johnson |
| 7,681,247 B2 | 3/2010 | Williams |
| 7,796,036 B2 | 9/2010 | Dalzell et al. |

(Continued)

OTHER PUBLICATIONS

INTELLITECH, "JTAG Security," 2009, retrieved from http://www.intellitech.com/pdf/anti-tamper-basics.pdf, on Feb. 23, 2015, 17 pages.

(Continued)

*Primary Examiner* — Lynn D Feild
*Assistant Examiner* — Abdullah Almamun
(74) *Attorney, Agent, or Firm* — Edell, Shapiro & Finnan, LLC

(57) ABSTRACT

A computing device includes a first component, a second component and a monitoring component. The monitoring component, receives, from the first component, a command to issue one or more transactions or data to the second component, and determines whether the first component is authorized to issue the one or more transactions, according to one or more policies or rules, which are received through an out-of-band mechanism to which the first component does not have access. If the monitoring component determines that the first component is authorized to issue the one or more transactions or data to the second component, it forwards the one or more transactions data to the second component. Otherwise, the monitoring component blocks the one or more transactions or data from being issued to the second component.

22 Claims, 5 Drawing Sheets

(56) References Cited

U.S. PATENT DOCUMENTS

| | | |
|---|---|---|
| 7,962,721 B1 | 6/2011 | King et al. |
| 8,032,745 B2 | 10/2011 | Bandholz et al. |
| 8,222,989 B2 | 7/2012 | Ziska et al. |
| 8,321,932 B2 * | 11/2012 | Bhargava ................. G06F 21/52 713/165 |
| 8,341,472 B2 | 12/2012 | Henry et al. |
| 8,495,758 B2 | 7/2013 | Goyal et al. |
| 8,719,957 B2 | 5/2014 | Pedersen |
| 8,726,407 B2 | 5/2014 | Etchegoyen |
| 8,798,852 B1 | 8/2014 | Chen et al. |
| 8,949,586 B2 | 2/2015 | Shroff et al. |
| 9,094,205 B2 | 7/2015 | Hartley et al. |
| 9,135,471 B2 * | 9/2015 | Stufflebeam, Jr. ....... G06F 21/72 |
| 9,760,720 B2 * | 9/2017 | Chapman, III ..... G06F 21/6218 |
| 2002/0072822 A1 | 6/2002 | Raymond et al. |
| 2003/0101354 A1 | 5/2003 | Okabe et al. |
| 2003/0204743 A1 | 10/2003 | Devadas et al. |
| 2004/0054894 A1 | 3/2004 | Lambert |
| 2005/0210349 A1 | 9/2005 | Lambert et al. |
| 2006/0149966 A1 | 7/2006 | Buskey et al. |
| 2006/0210082 A1 | 9/2006 | Devadas et al. |
| 2007/0123304 A1 | 5/2007 | Pattenden et al. |
| 2007/0123316 A1 | 5/2007 | Little |
| 2007/0168669 A1 | 7/2007 | Jonas |
| 2007/0174700 A1 | 7/2007 | Dalzell et al. |
| 2008/0163349 A1 | 7/2008 | Okimura et al. |
| 2010/0056228 A1 | 3/2010 | Brown et al. |
| 2010/0211678 A1 * | 8/2010 | McDysan ............ G06F 11/2028 709/225 |
| 2011/0062240 A1 | 3/2011 | Anderson et al. |
| 2011/0145586 A1 | 6/2011 | Meyn et al. |
| 2012/0079332 A1 | 3/2012 | Doumenjou et al. |
| 2012/0159652 A1 | 6/2012 | Gurumoorthy et al. |
| 2012/0242459 A1 | 9/2012 | Lambert |
| 2013/0081103 A1 * | 3/2013 | Uner ....................... G06F 21/56 726/1 |
| 2013/0157618 A1 | 6/2013 | Billau et al. |
| 2013/0158936 A1 | 6/2013 | Rich et al. |
| 2013/0191643 A1 | 7/2013 | Song et al. |
| 2013/0263290 A1 | 10/2013 | Xu |
| 2013/0269043 A1 | 10/2013 | Limaye et al. |
| 2014/0068702 A1 * | 3/2014 | Hyndman ............... G06F 21/41 726/1 |
| 2014/0164779 A1 | 6/2014 | Hartley et al. |
| 2014/0181894 A1 | 6/2014 | Von Bokem et al. |
| 2014/0195808 A1 * | 7/2014 | Lortz ................... G06F 15/177 713/170 |
| 2015/0101012 A1 * | 4/2015 | White .................. G06F 16/245 726/1 |
| 2015/0186449 A1 | 7/2015 | Raghavan et al. |
| 2015/0242620 A1 | 8/2015 | Newell et al. |
| 2016/0170826 A1 | 6/2016 | Oechsle et al. |
| 2016/0171223 A1 | 6/2016 | Covey et al. |
| 2016/0196442 A1 * | 7/2016 | Chapman, III ......... G06F 21/53 726/29 |
| 2016/0247002 A1 | 8/2016 | Grieco et al. |
| 2017/0093700 A1 * | 3/2017 | Gilley .................... H04L 45/44 |
| 2017/0163427 A1 * | 6/2017 | Edwards ............... H04L 9/3271 |

OTHER PUBLICATIONS

Freescale Semiconductor, "i.MX53 Applications Processors for Industrial Products, Silicon Version 2.1," Data Sheet: Technical Data, Document No. IMX53IEC, Rev. 6, Mar. 2013, 173 pages.

Rosenfeld, et al., "Attacks and Defenses for JTAG," Verifying Physical Trustworthiness of ICs and Systems, IEEE Design & Test of Computers, Aug. 2009, 12 pages.

* cited by examiner

PROTECTING AND MONITORING INTERNAL BUS TRANSACTIONS

TECHNICAL FIELD

The present disclosure relates to maintaining security of operations performed in a computing device.

BACKGROUND

The number of controllers in computing devices has recently increased dramatically. Controllers included in computing devices are currently used to control and measure parameters such as fan speed, memory configuration and voltage settings. Unfortunately, as the number of functions controlled by these devices increases, so too does the associated security threat. For example, a malicious party may take over a computing device and issue unauthorized commands to one or more of the controllers in the computing device, damaging, or possibly destroying, the device itself. In certain deployments, such as government and financial networks, for example, such threats may lead to costly damages, or worse. However, enforcing policies inside a computing device can be difficult, particularly if a malicious party has gained control of a processor or software inside the computing device.

DESCRIPTION OF EXAMPLE EMBODIMENTS

Overview

In accordance with one embodiment, a computing device includes a first component, a second component and a third component that is also referred to as a monitoring component. The monitoring component, receives, from the first component, a command to issue one or more transactions or data to the second component, and determines whether the first component is authorized to issue the one or more transactions, according to one or more policies or rules, which are received through an out-of-band (OOB) mechanism to which the first component does not have access. If the monitoring component determines that the first component is authorized to issue the one or more transactions or data to the second component, it forwards the one or more transactions or data to the second component. Otherwise, the monitoring component blocks the one or more transactions or data from being issued to the second component.

Example Embodiments

Figure 1:
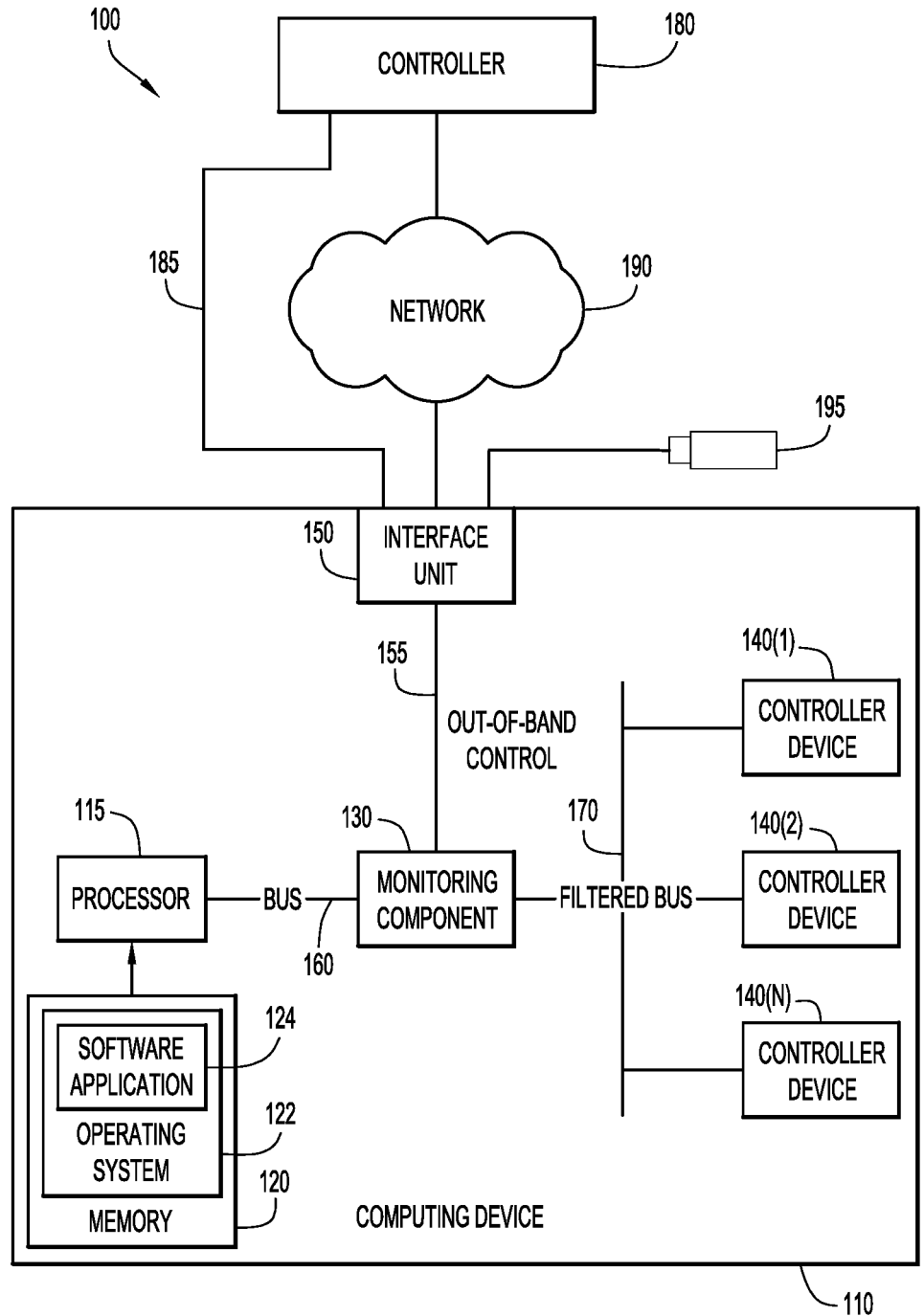
FIG. 1 is a high-level diagram illustrating a security management system in which processor transactions of a computing device are monitored to prevent unauthorized transactions from reaching an internal bus of the computing device, according to an example embodiment.

With reference first to FIG. 1, there is depicted a block diagram of a security management system 100 that includes a computing device 110 comprising one or more processors 115, a memory 120, a monitoring component 130, one or more and controller devices 140(1)-140(N), and one or more interface units 150. The one or more interface units 150 may take the form of network interface cards that enable network communications, such as wired or wireless network communications, or may be any mechanism that enables OOB control communications with monitoring component 130. For example, interface unit 150 may be a standard interface, one or more buses, one or more networks, one or more controllers or one or more processors. The one or more processors 115 are sometimes collectively and generally referred to herein as a "first component" of the computing device 110 and the one or more controller devices 140(1)-140(N) are sometimes collectively and generally referred to as a "second component" of the computing device. Moreover, the monitoring component is sometimes referred to herein as a "third component" of the computing device 110.

The one or more processors 115 may be a microprocessor or a microcontroller. It should be understood, however, that processor 115 may be any component and/or device configured to issue commands and/or data over any communication channel or medium. For example, processor 115 may be one or more networks, one or more controlled buses, one or more interfaces or one or more controllers.

It should be further understood that monitoring component 130 may be any suitable programmable device, such as an application specific integrated circuit ("ASIC"), a field-programmable gate array ("FPGA"), or any such immutable device, e.g., a solid-state device having Read-Only Memory ("ROM"), that is capable of receiving policies or rules from an external device through an OOB mechanism. Accordingly, monitoring component 130 may be any component or device that is configured to determine whether to forward transactions and/or data received from a first component or device to a second component or device based on a set of policies or rules received through an OOB mechanism to which the first component does not have access.

The system 100 further includes a controller 180 that can communicate with the computing device 110 via link 185 or a network 190. Network 190 may include one or more wide area networks (WANs), such as the Internet, and one or more local area networks (LANs). The system may optionally include an external memory device 195 that may store OOB control information that may be communicated to monitoring component 130. For example, monitoring component 130 may be a field programmable gate array ("FPGA") and memory device 195 may store FPGA programming code that is loaded onto monitoring component 130 when computing device 110 is initially powered-up.

The memory 120 may include read only memory (ROM), random access memory (RAM), magnetic disk storage media devices, optical storage media devices, flash memory devices, electrical, optical, or other physical/tangible memory storage devices that stores executable instructions for an operating system 122 and for one or more software applications 124. Thus, in general, memory 120 may include one or more tangible (non-transitory) computer readable storage media (e.g., a memory device) encoded with software comprising computer executable instructions and when the software is executed (by processor 115) it is operable to perform the operations of computing device 110, which provides a platform on which the operating system 122 and one or more software applications 124 stored in memory 120 may be executed by processor 115.

As shown in FIG. 1, processor 115 is in communication with monitoring component 130 via bus 160. In turn, monitoring component 130 is in communication with the one or more controller devices via a filtered bus 170. The monitoring component 130 is further coupled to the one or more interface units 150 via OOB control link 155 to the controller 180.

As shown in FIG. 1, controller 180 may send OOB control messages to monitoring component 130 via network 190. Optionally, controller 180 may send OOB control messages directly via link 185 to a connection in a physical port in computing device 110. It should be understood, however, that any external mechanism, e.g., memory 195, currently known or later developed, may be used to communicate OOB control information to monitoring component 130 via OOB control link 155.

Although shown in FIG. 1 as a single bus, bus 160 and/or filtered bus 170 may be one or more buses or communication channels and may be any type of bus, channel, or communication medium on which processor 115 may issue commands and/or transactions to one or more controller devices 140(1)-140(N). For example, bus 160 and/or filtered bus 170 may be an Inter-Integrated Circuit (I2C) bus, a twin-wire interface (TWI) bus, a Serial Peripheral Interface ("SPI") bus, a Controller Area Network ("CAN") bus, a Joint Test Action Group ("JTAG") bus, an ACCESS bus, a System Management bus (SMBus), a Power Management bus (PM-Bus) and/or an Intelligent Platform Management bus (IPMB).

Computing device 110 may be a wired or wireless communication device and may operate in accordance with any communication/network technology, including, but not limited to, Ethernet, Wi-Fi®, Bluetooth®, 4G or LTE, etc. For example, computing device 110 may be a laptop, tablet, smartphone, etc. In still another example, the computing device 110 may be a network device, such as a router, switch, firewall, gateway, etc. Controller devices 140(1)-140(N) may be any device that monitors and/or controls various functions and/or devices in computing device 110 and each is responsive to commands received from processor 115 via bus 160 and filtered bus 170. For example, the controller devices 140(1)-140(N) may include a voltage regulator that controls/monitors the power supply in computing device 110, a temperature regulator that controls fan speeds in computing device 110, etc. A controller device 140(1)-140(N) may be an Inter-Integrated Circuit (I2C) device that may have its own registers, memory and an executable command set.

In operation, processor 115 executes operating system 122 and/or one or more applications 124, and, in response to a request received from operating system 122 and/or or one or more software applications 124, generates a command to monitoring component 130 to initiate/issue one or more transactions to one or more specified controller devices 140(1)-140(N) and places the command on bus 160. In response to receiving the command from processor 115, monitoring component 130 determines whether processor 115 is authorized to issue the one or more transactions on the bus. For example, monitoring component 130 may confirm that each of the one or more transactions is included in an access list, i.e., a "white" list, of commands that processor 115 is authorized to issue, or may confirm that none of the one or more transactions is included in a "black" list of commands that processor 115 is expressly prohibited from issuing. According to an embodiment, processor 115 may encrypt the command including the one or more transactions with a private encryption key uniquely associated with processor 115. Monitoring component 130 may then decrypt the encrypted command using a public encryption key associated with processor 115, thereby authenticating processor 115 and validating the one or more transactions. According to a further embodiment, monitoring component 130 may confirm that processor 115 is authorized to issue a command by checking predefined policies that may include a list of conditions and/or events under which processor 115 is authorized to issue specific commands. For example, processor 115 may be allowed to issue a read voltage value command, but may not issue a write voltage value command. Further examples of policy-based rules may include that processor 115 is allowed to issue read commands only within a predefined period after computing device 110 has powered on, or that processor 115 is allowed to issue any command provided that processor 115 provides an appropriate cryptographic key to monitoring component 130. According to an embodiment, monitoring component 130 may notify network controller 180 if processor 115 attempts to issue any unauthorized commands or may seek approval from network controller 180 if processor 115 issues any commands that are defined as highly sensitive, e.g., processor 115 seeks to change the voltage on a power rail in computing device 110.

It should be understood that monitoring component 130 may be required to authorize every command to issue one or more transactions received from processor 115 before issuing the one or more transactions on filtered bus 170. Therefore, even if headers are required to program a component/device in computing device 110 during manufacturing, the authentication mechanism described herein may implemented to ensure that the required headers associated with the one or more components/devices in computing device 110 may not be used to bypass the authentication protections provided by monitoring component 130.

In deployments such as those shown in FIG. 1, it may be desirable to allow controller 180 to initially define and/or dynamically update the commands that processor 115 is authorized to initiate on the filtered bus 170 and/or the conditions under which processor 115 is authorized to issue specific commands. To preserve the integrity of the authorization lists and/or policy-based rules received from controller 180, it may be desirable to prevent processor 115 from having access to define and/or modify the access lists and/or policy-based rules. Accordingly, the system and method described herein provide for an OOB control mechanism wherein only controller 180 may generate and/or update the rules and policies enforced by monitoring component 130, via OOB control link 155. That is, because the rules and policies enforced by monitoring component 130 are exclusively defined by controller 180 via a secure OOB control link 155 to which processor 115 does not have access, processor 115 is unable to modify the rules and policies that define the decision-making performed by monitoring component 130.

Generally, a controller 180 initially defines the rules and policies to be enforced by a monitoring component 130, authorizing the commands that processor 115 may issue to one or more controller devices 140(1)-140(N) in computing device 110. Therefore, to issue one or more transactions to one or more controller devices 140(1)-140(N), processor 115 sends a command to monitoring component 130 requesting that monitoring component 130 issue the one or more transactions included in the command to the one or more controller devices 140(1)-140(N). If monitoring component 130 determines that processor 115 is authorized to issue the one or more transactions, monitoring component 130 will issue the one or more transactions to the one or more controller devices 140(1)-140(N) on filtered bus 170. If, however, monitoring component 130 determines that processor 115 is not authorized to issue the one or more transactions, monitoring component 130 will block the one or more transactions from being issued on filtered bus 170. Optionally, monitoring component 130 may send an alarm signal to controller 180 if it determines that processor 115 is not authorized to issue the one or more transactions, alerting controller 180 that processor 115 has issued an unauthorized command.

As discussed in greater detail below, controller 180 may be a stand-alone computer or a server running one or more applications responsible for controlling the operations of one or more monitoring components 130 in one or more computing devices 110. Alternatively, controller 180 may be an application running in a cloud/data-center environment.

Figure 2:
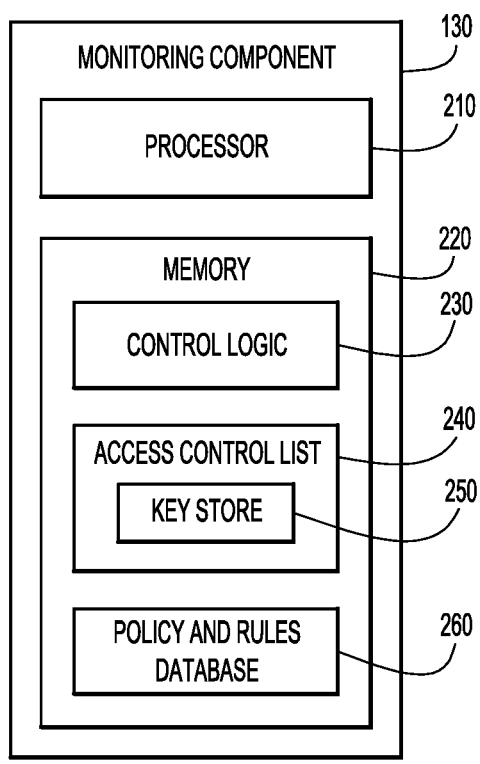
FIG. 2 is a block diagram of a monitoring component configured to participate in operations of the security management system, according to an example embodiment.

Reference is now made to FIG. 2, which shows the monitoring component 130 of FIG. 1 in more detail, according to an embodiment. As shown in FIG. 2, monitoring component 110 may include one or more processors 210 and a memory 220, which stores executable software instructions for control logic 230, and stores data for access control list 240, including key store 250, and a policy and rules database 260. The one or more processors 210 may be a microprocessor or a microcontroller. The memory 220 may include read only memory (ROM), random access memory (RAM), magnetic disk storage media devices, optical storage media devices, flash memory devices, electrical, optical, or other physical/tangible memory storage devices. Thus, in general, memory 220 may include one or more tangible (non-transitory) computer readable storage media (e.g., a memory device) encoded with software comprising computer executable instructions and when the software is executed (e.g., by processor 210) it is operable to perform the operations of the monitoring component 130 described herein.

Control logic 230 includes instructions for determining whether processor 115 is authorized to issue one or more commands, including one or more transactions, to one or more controller devices 140(1)-140(N). As discussed above, the monitoring component 130 in its entirety or portions thereof may be implemented in, or be performed by, any suitable programmable device, such as an application specific integrated circuit ("ASIC"), a field-programmable gate array ("FPGA"), or any such immutable device, e.g., a solid-state device having Read-Only Memory ("ROM"), which may be desirable for function as well as cost. For example, the monitoring component 130 could be part of an existing FPGA used in the computing device (such as a secure boot device) or as a stand-alone device similar to an Inter-Integrated Circuit multiplexer.

Access control list 240 may include a list of specific commands that processor 115 is authorized to issue, and/or a list of specific commands that processor 115 is not authorized to issue, to the one or more controller devices 140(1)-140(N). Optionally, access control list 240 may further include key store 250 which may store public cryptographic keys associated with processor 115, enabling monitoring component 115 to authenticate one or more commands received from processor 115. Policy and rules database 260 stores conditions and/or events under which processor 115 may, or may not, be authorized to issue one or more specific commands. It should be understood that access control list 240 and policy and rules database 260 may identify commands that processor 115 is authorized to issue, and/or not authorized to issue, for each individual controller device 140(N). It should be further understood that controller 180 or external memory 195 may initially populate and/or dynamically modify the authorized commands included in access control list 240 and the policies associated with processor 115 included in policy and rules database 260. Processor 210 may execute instructions for control logic 230. For example, processor 210 may execute instructions causing control logic 230 to determine whether processor 115 is authorized to issue one or more commands on filtered bus 170. It should be understood that, while FIG. 2 shows them as separate entities, the access control list 240 and rules database 260 may be integrated together.

Referring again to FIG. 1, in general, the disclosed embodiments provide a secure environment in which an external controller may define an access control list 240 and/or a policies and rules database 260 that are to be enforced by a monitoring component 130 to prevent processor 115 from issuing unauthorized transactions to one or more controller devices 140(1)-140(N) residing in computing device 110. For example, after receiving a command to issue one or more transactions to one or more controller devices 140(1)-140(N), monitoring component 130 consults access list 240 and/or policies and rules database 260 to determine whether the processor 115 is authorized to issue the one or more transactions included in the received command. If monitoring component 130 determines that the one or more transactions is authorized, it issues the one or more transactions to the one or more controller devices 140(1)-140(N) on filtered bus 170; otherwise, monitoring component 130 blocks the transactions from being issued. Optionally, if monitoring component 130 determines that a received transaction is not authorized by controller 180, monitoring component 130 sends to the controller 180 an alarm signal alerting it that processor 115 attempted to issue an unauthorized transaction.

Figure 3A:
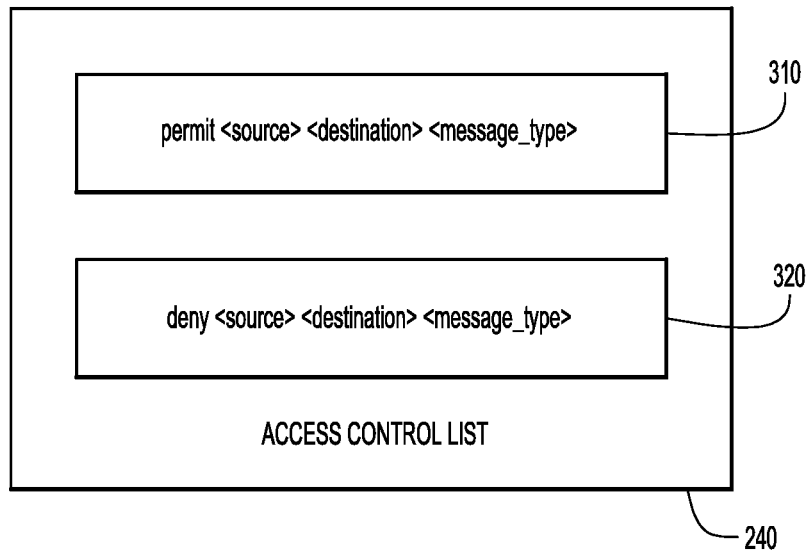
FIG. 3A is a diagram of an access control list used in the monitoring component, according to an example embodiment.

Reference is now made to FIG. 3A, a diagram is shown of an example access control list 240 in monitoring component 130, according to an example embodiment. As shown in FIG. 3A, access control list 240 may include a look-up table that includes one or more transactions 310 that processor 115 is authorized to issue to one or more controller devices 140(1)-140(N). For example, authorized transaction 310 may identify a source device, e.g., processor 115, that is authorized to issue a given message type, e.g., a command including one or more transactions, to a specific destination, e.g., one or more controller devices 140(1)-140(N). As further shown in FIG. 3A, access control list 240 may also include one or more transactions 320 that processor 115 is expressly not authorized to issue to one or more controller devices 140(1)-140(N). For example, unauthorized transaction 320 may identify a source device, e.g., processor 115, that is not authorized to issue a given message type, e.g., a command including one or more transactions, to a specific destination, e.g., one or more controller devices 140(1)-140(N). It should be understood, however, that "source device," "destination device," and/or "message type" may be optional fields, or wildcards, in the look-up table included in access control list 240. For example, access control list 240 may contain one or more records instructing monitoring component 130 to permit or deny any command issued from a specific source device, e.g., processor 115. Accordingly, these one or more records may contain only a "source device" field. Similarly, access control list 240 may further contain one or more records instructing monitoring component 130 to permit or deny any command issued to a specific destination device, e.g., controller 140(1). As such, these one or more records may contain only a "destination device" field. Additionally, access control list 240 may further include one or more records authorizing a specific source device to issue one or more specific message types to any destination device. As such, these one or more records may contain both a "source device" field and a "message type" field, but not a "destination device" field.

Figure 3B:
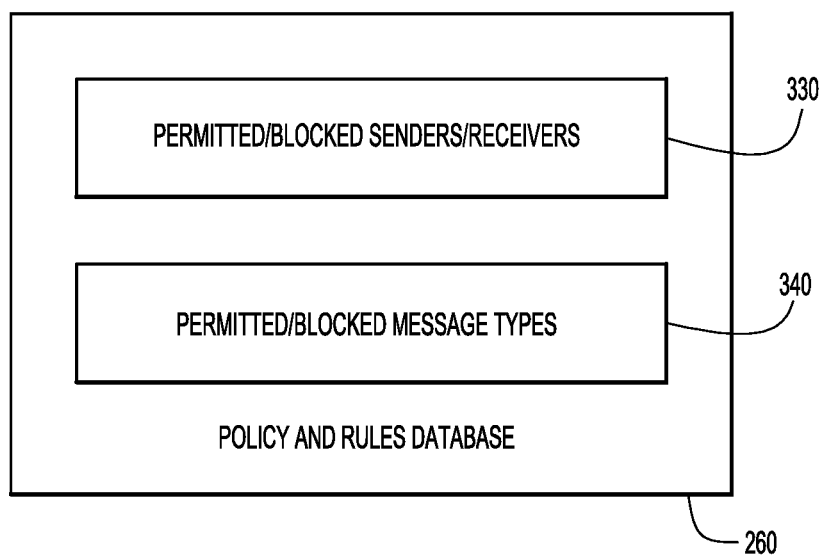
FIG. 3B is a diagram of a policy and rules database used in the monitoring component, according to an example embodiment.

Reference is now made to FIG. 3B, a diagram is shown of an example policy and rules database 260 in monitoring component 130, according to an example embodiment. As shown in FIG. 3B, policy and rules database 260 may include a look-up table that includes one or more rules 330 that define when a sender, e.g., processor 115 is permitted, to issue one or more transactions to one or more receivers, e.g., controller devices 140(1)-140(N), and/or when a sender, e.g., processor 115 is to be blocked, from issuing one or more transactions to one or more receivers, e.g., controller devices 140(1)-140(N). As further shown in FIG. 3B, policy and rules database 260 may further include one or more rules 340 that define when specific message types, e.g., one or more commands including one or more transactions, are permitted, and/or when specific message types, e.g., one or more commands including one or more transactions, are to be blocked.

Figure 4:
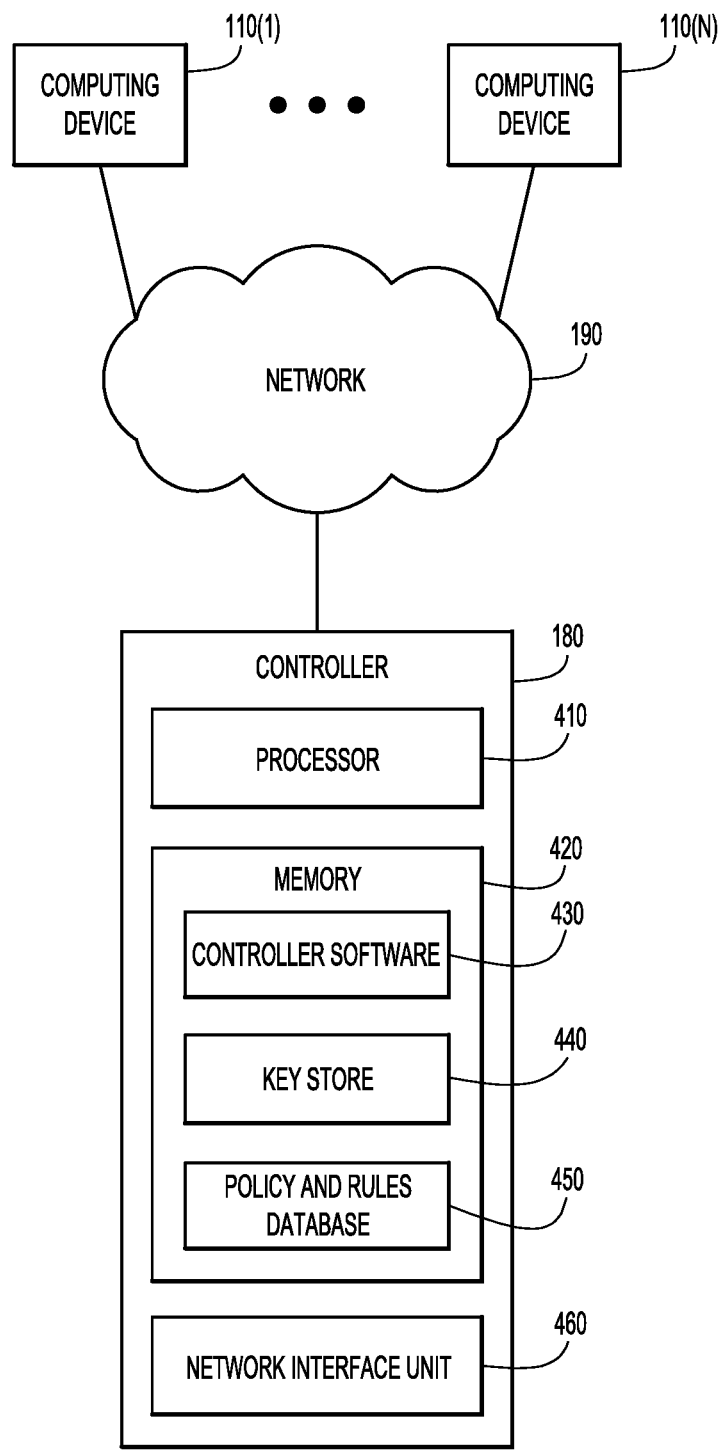
FIG. 4 is a block diagram of a controller configured to manage the operations of a monitoring component in one or more computing devices, according to an example embodiment.

Reference is now made to FIG. 4, which shows the controller 180 of FIG. 1 in more detail, according to an embodiment. As shown in FIG. 4, controller 180 may include one or more processors 410 and a memory 420. The memory 420 may store executable software instructions for controller software 430, and data for key store 440 and a policy and rules database 450. The controller may further include one or more interface units 460 that enable communication to the monitoring component 130 in each of one or more computing devices 110(1)-110(N) via network 190. Optionally, controller 180 may send OOB control information to the monitoring component 130 in each of one or more computing devices 110(1)-110(N) directly over link 185, e.g., via a direct connection to a physical port in each of the one or more computing devices 110(1)-110(N).

The one or more processors 410 may be a microprocessor or a microcontroller. The memory 420 may include read only memory (ROM), random access memory (RAM), magnetic disk storage media devices, optical storage media devices, flash memory devices, electrical, optical, or other physical/tangible memory storage devices. Thus, in general, memory 420 may include one or more tangible (non-transitory) computer readable storage media (e.g., a memory device) encoded with software comprising computer executable instructions and when the software is executed (e.g., by processor 410) it is operable to perform the operations of the controller 180 described herein.

Controller software 430 may include instructions enabling controller 180 to manage the operations of the monitoring component 130 in each of one or more computing devices 110(1)-110(N) by sending out-of-band control information to the monitoring component 130 in the respective one or more computing devices 110(1)-110(N), thereby providing the monitoring component 130 with rules that define when the processor 115 in the respective computing device 110 is authorized to issue one or more commands to filtered bus 170. For example, controller software 430 may send an instruction to a monitoring component 130 of a computing device 110 requiring that the monitoring component 130 prevent an associated processor 115 from issuing a write/set command to a sensitive voltage rail inside a computing device 110. It should be understood that controller software 430 may further include instructions for initially populating and/or dynamically modifying the rules to be enforced by the monitoring component 130 in each of the one or more computing devices 110(1)-110(N). Controller software 430 may further include instructions for processing alerts received from the monitoring component 130 of the one or more computing devices 110, which alerts may indicate that the processor 115 in a computing 110 device has attempted to issue one or more unauthorized commands.

Controller 180 may optionally include key store 440, which may store public cryptographic keys associated with the one or more processors 115 in each of the one or more computing devices 110(1)-110(N), enabling each of the one or more associated monitoring components 130 to authenticate one or more commands received from the one or more processors 115. Policy and rules database 450 may store rules under which, for a given condition and/or event, one or more processors 115 may, or may not, be authorized to issue one or more specific commands to the filtered bus 170 in the computing device and ultimately to one or more associated controllers 140(1)-140(N). Policy and rules database 450 may further identify specific commands that the processor 115 in a computing device 110 is authorized to issue, and/or not authorized to issue, for each associated controller device 110. Processor 410 may execute instructions for controller module 430. For example, processor 410 may execute instructions causing controller module 430 to send out-of-band control information to a monitoring component 130 of a computing device 110 enabling the monitoring component 130 to determine whether an associated processor 115 is authorized to issue one or more commands to filtered bus 170.

Figure 5:
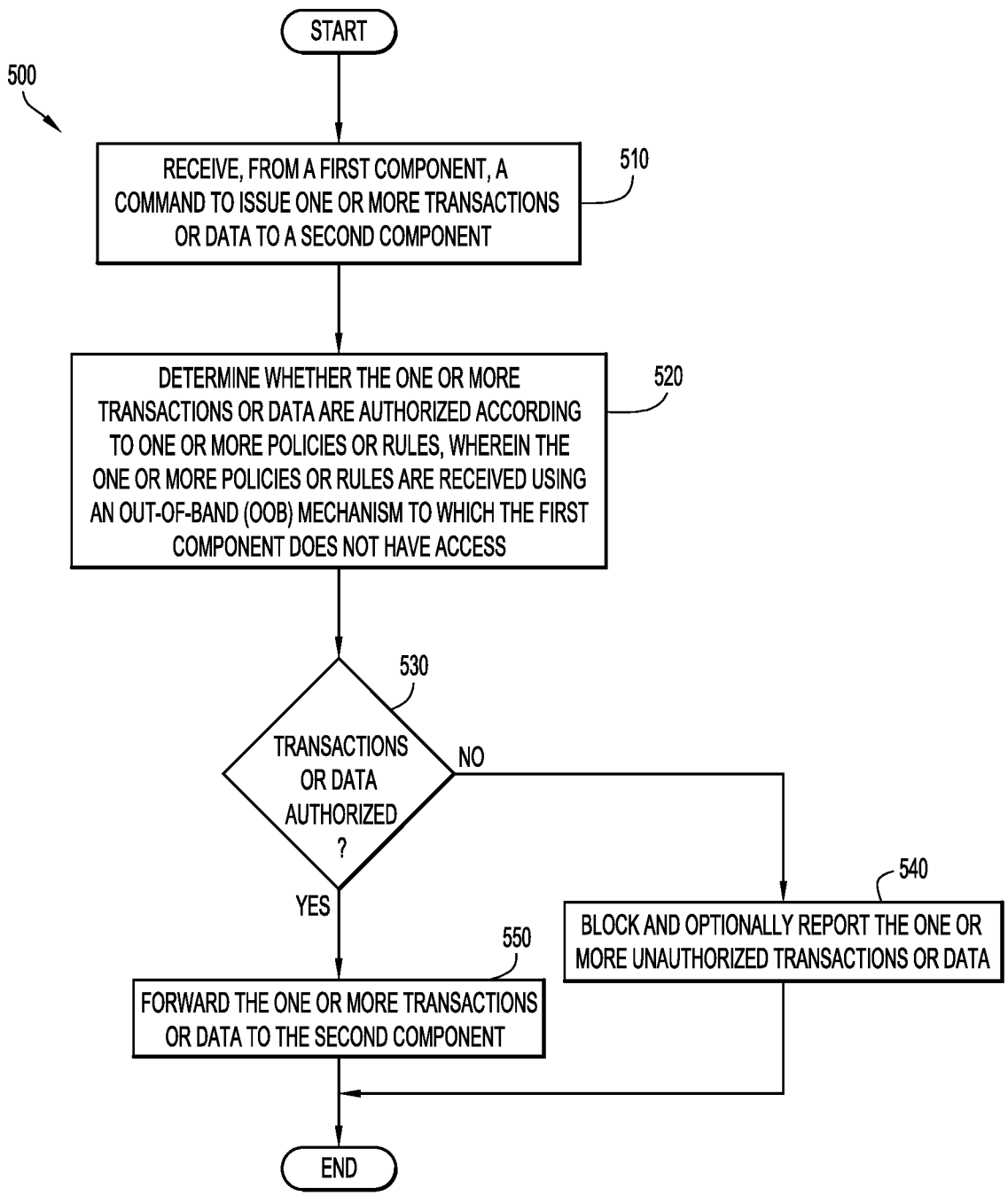
FIG. 5 is a flowchart depicting operations performed to monitor and authorize commands to issue transactions on an internal bus of a computing device, according to an example embodiment.

With reference to FIG. 5 and continued reference to FIGS. 1, 2, 3A and 3B, and 4, a flowchart is shown of a process 500 performed to authorize a command received from a first component to issue one or more transactions or data to one or more second components, according to an example embodiment.

At 510, monitoring component 130 receives from a first component a command to issue one or more transactions or data to a second component. At 520, monitoring component 130 determines whether the first component is authorized, according to one or more policies or rules, to issue the one or more transactions or data to the second component, wherein the one or more policies or rules are received using an out-of-band (OOB) mechanism to which the first component does not have access.

If the monitoring component 130 determines that the first component is authorized to issue the one or more transactions or data, operations proceed to 550, otherwise, at 540, monitoring component 130 blocks the received command, thereby preventing the one or more transactions or data from being issued to the second component, and method 500 ends. According to an alternative embodiment, at 540, monitoring component 130 may further send an alert signal to controller 180 reporting that monitoring component 130 has intercepted and blocked an unauthorized command to issue one or more transactions or data.

At 550, monitoring component 130 issues the one or more transactions or data included in the received command to the second component, and method 500 ends.

The embodiments presented herein verify and/or monitor commands to issue transactions or data to devices that control critical system functionality of a computing device. An out-of-band mechanism is provided that only allows commands that a programmer or other authorized or trusted person or entity has approved to be safe, while other commands are blocked and/or reported.

The embodiments disclosed herein allow an external controller entity or application to securely define, via an out-of-band mechanism, the commands that a processor is authorized to issue to one or more controller devices in a computing device, as well as to securely define the commands that a processor is not authorized to issue to one or more controller devices in a computing device. Similarly, the embodiments disclosed herein also allow a controller to securely define the conditions and/or events under which a processor is authorized, or not authorized, to issue specific commands to one or more controller devices in a computing device. For example, a processor may be authorized to read voltage values associated with a power rail in the computing device, but may be prevented from setting the voltage values associated with the power rail. The access lists and/or policy and rules database may be initially defined, or subsequently modified, only by an administrator through an out-of-band link to a monitoring component that monitors every transaction issued by the one or more processors in the computing device. The one or more processors are, therefore, unable to modify the access lists and/or policy-based rules applied by the monitoring component. Optionally, the monitoring component may be required to cryptographically authenticate the processor before the processor is authorized to issue any transactions on the internal bus. As a result, the integrity of internal bus transactions is securely preserved, ensuring that only authorized transactions are issued onto the internal bus. Furthermore, if the monitoring device detects an unauthorized transaction, it may send an alarm signal to the controller, alerting the controller that the computing device may be compromised, thereby preserving the integrity of the computing device and, potentially, other computing devices within the same network.

Advantages of the embodiments include providing an additional layer of security to control/restrict the ability of third parties to maliciously attack a computing device by gaining control of one or more processors in the computing device. In certain deployments, such as government and financial institutions, there is a requirement that computing devices provide secure and continuous services. Thus, the monitoring component referred to herein may be deployed in certain environments where this additional layer of security is desired. According to embodiments presented herein, a processor may only issue one or more transactions on an internal bus if a network controller has previously authorized the processor to issue the one or more transactions and/or the monitoring component cryptographically authenticated the processor. In so doing, the monitoring component described herein may verify that a processor is authorized to issue one or more transactions before placing the one or more transactions onto an internal bus connected to one or more controller devices, thereby preventing a malicious attacker from damaging, destroying or even taking control over the computing device.

In accordance with one embodiment, a method and system are disclosed in which a monitoring component, using stored data, validates a command for one or more transactions or data to one or more controller devices prior to issuing the one or more transactions on an internal bus. The stored data may be initially defined, or subsequently modified, only by an external controller, via an out-of-band mechanism to the monitoring component. In so doing, only the controller is able to determine the transactions that the one or more processors in a computing device are authorized to issue. As such, the out-of-band mechanism prevents a malicious attacker from using the processor to corrupt the data stored in the monitoring component, ensuring the integrity of the internal bus.

In one form, a method is provided comprising: in a computing device: receiving, from a first component, a command to issue one or more transactions or data to a second component; determining whether the one or more transactions or data are authorized according to one or more policies or rules, wherein the one or more policies or rules are received using an out-of-band mechanism to which the first component does not have access; and if it is determined that the one or more transactions or data are authorized, forwarding the one or more transactions or data to the second component, and otherwise, blocking the one or more transactions or data.

In another form, an apparatus is provided comprising: a first component; second component; and a monitoring component coupled to the first component and to the second component, and configured to: receive from the first component a command to issue one or more transactions or data to the second components; determine whether the one or more transactions or data are authorized according to one or more policies or rules, wherein the one or more policies or rules are received using an out-of-band mechanism to which the first component does not have access; and if it is determined that the one or more transactions or data are authorized, forward the one or more transactions or data to the second component, and otherwise, block the one or more transactions or data.

In yet another form, a non-transitory computer readable storage media storing executable instructions that are operable in a computing device, to perform operations to: receive from a first component a command to issue one or more transactions or data to a second component; determine whether the one or more transactions or data are authorized according to one or more policies or rules, wherein the one or more policies or rules are received using an out-of-band mechanism to which the first component does not have access; and if it is determined that the one or more transactions or data are authorized, forward the one or more transactions or data to the second component, and otherwise, block the one or more transactions or data.

The above description is intended by way of example only. Various modifications and structural changes may be made therein without departing from the scope of the concepts described herein and within the scope and range of equivalents of the claims.

What is claimed is:

1. A method comprising:
   at a monitoring component in a computing device:
   receiving, from a controller device external to the computing device, one or more policies or rules,
   wherein the monitoring component is coupled to at least one controller in the computing device via a first internal bus and is coupled to at least one processor of the computing device via a second internal bus, and wherein the one or more policies or rules are received from the controller device external to the computing device via an out-of-band mechanism to which the at least one processor does not have access;

storing the one or more policies or rules in a policy and rules database of the monitoring component without providing the at least one processor with access to the one or more policies or rules;

receiving, from the at least one processor in the computing device, a command to issue one or more transactions or data to the at least one controller in the computing device;

determining whether the one or more transactions or data are authorized according to the one or more policies or rules stored in the policy and rules database of the monitoring component; and when it is determined that the one or more transactions or data are authorized according to the one or more policies or rules stored in the policy and rules database of the monitoring component, forwarding the one or more transactions or data to the at least one controller via the first internal bus of the computing device, and otherwise, blocking the one or more transactions or data.

2. The method of claim 1, further comprising:

receiving, via the out-of-band mechanism, policy data descriptive of the one or more policies or rules from the controller device external to the computing device; and storing the policy data descriptive of the one or more policies or rules.

3. The method of claim 1, wherein storing the one or more policies or rules comprises:

storing the one or more policies or rules in a cryptographically secure manner.

4. The method of claim 1, wherein determining whether the one or more transactions or data are authorized according to the one or more policies or rules stored in the policy and rules database of the monitoring component includes:

determining whether the one or more transactions or data are included in a list of authorized transactions or data received via the out-of-band mechanism.

5. The method of claim 1, wherein determining whether the one or more transactions or data are authorized according to the one or more policies or rules stored in the policy and rules database of the monitoring component includes:

determining whether the one or more transactions or data are included in a list of unauthorized transactions or data received via the out-of-band mechanism.

6. The method of claim 1, wherein the one or more policies or rules include one or more conditions for which the at least one processor is authorized to send one or more transactions or data to the at least one controller.

7. The method of claim 1, wherein determining whether the one or more transactions or data are authorized according to the one or more policies or rules stored in the policy and rules database of the monitoring component includes:

cryptographically authenticating a source of the command.

8. The method of claim 1, further including:

logging, by the monitoring component, the one or more transactions or data received from the at least one processor; and when it is determined that the one or more transactions or data are not authorized, sending an alarm to an external device alerting the external device that at least one unauthorized transaction or data was received from the at least one processor.

9. The method of claim 1, wherein the one or more policies include at least one of:

a policy permitting read transactions to the at least one controller by the at least one processor only during a particular period of time, a policy permitting read transactions but not write transactions to the at least one controller, and a policy permitting any transaction based on receipt of an appropriate cryptographic key.

10. An apparatus comprising:

at least one processor;

at least one controller; and a monitoring component coupled to the at least one controller via a first internal bus and the at least one processor via a second internal bus, and configured to:

receiving, from a controller device external to the apparatus, one or more policies or rules via an out-of-band mechanism to which the at least one processor does not have access;

store the one or more policies or rules in a policy and rules database of the monitoring component without providing the at least one processor with access to the one or more policies or rules;

receive, from the at least one processor via the second internal bus, a command to issue one or more transactions or data to the at least one controller;

determine whether the one or more transactions or data are authorized according to the one or more policies or rules stored in the policy and rules database of the monitoring component; and when it is determined that the one or more transactions or data are authorized according to the one or more policies or rules stored in the policy and rules database of the monitoring component, forward the one or more transactions or data to the at least one controller via the first internal bus, and otherwise, block the one or more transactions or data.

11. The apparatus of claim 10, wherein the monitoring component is further configured to:

receive, via the out-of-band mechanism, policy data descriptive of the one or more policies or rules from the controller device external to the apparatus; and store the policy data descriptive of the one or more policies or rules.

12. The apparatus of claim 10, wherein the one or more policies or rules are stored in a cryptographically secure manner.

13. The apparatus of claim 10, wherein to determine whether the one or more transactions or data are authorized according to the one or more policies or rules stored in the policy and rules database of the monitoring component, the monitoring component is configured to:

determine whether the one or more transactions or data are included in a list of authorized transactions received via the out-of-band mechanism.

14. The apparatus of claim 10, wherein the monitoring component is further configured to:

log the one or more transactions or data received from the at least one processor; and when it is determined that the one or more transactions or data are not authorized, send an alarm to an external device alerting the external device that at least one unauthorized transaction or data was received from the at least one processor.

15. A non-transitory computer readable storage media storing executable instructions that are operable in a computing device, to perform operations to:

at a monitoring component in the computing device:

receive, from a controller device external to the computing device, one or more policies or rules, wherein the monitoring component is coupled to at least one controller in the computing device via a first internal bus and is coupled to at least one processor of the computing device via a second internal bus, and wherein the one or more policies or rules are received from the controller device external to the computing device via an out-of-band mechanism to which the at least one processor does not have access;

store the one or more policies or rules in a policy and rules database of the monitoring component without providing the at least one processor with access to the one or more policies or rules;

receive from the at least one processor in the computing device a command to issue one or more transactions or data to the at least one controller in the computing device;

determine whether the one or more transactions or data is authorized according to the one or more policies or rules stored in the policy and rules database of the monitoring component; and when it is determined that the one or more transactions or data are authorized according to the one or more policies or rules stored in the policy and rules database of the monitoring component, forward the one or more transactions or data to the at least one controller via the first internal bus of the computing device, and otherwise, block the one or more transactions.

16. The non-transitory computer readable storage media of claim 15, wherein the instructions operable to store the one or more policies or rules in a policy and rules database of the monitoring component further comprise instructions that are operable to store the one or more policies or rules in a cryptographically secure manner.

17. The non-transitory computer readable storage media of claim 15, wherein the instructions operable for determining whether the one or more transactions or data are authorized according to the one or more policies or rules stored in the policy and rules database of the monitoring component comprise instructions operable to:

determine whether the one or more transactions or data are included in a list of authorized transactions received via the out-of-band mechanism.

18. The non-transitory computer readable storage media of claim 15, wherein the instructions operable for determining whether the one or more transactions or data are authorized according to the one or more policies or rules stored in the policy and rules database of the monitoring component comprise instructions operable to:

determine whether the one or more transactions or data are included in a list of unauthorized transactions or data received via the out-of-band mechanism.

19. The non-transitory computer readable storage media of claim 15, wherein the one or more policies or rules include one or more conditions for which the at least one processor is authorized to send one or more transactions or data to the at least one controller.

20. The non-transitory computer readable storage media of claim 15, wherein the instructions operable to determine whether the one or more transactions or data are authorized according to one or more policies or rules stored in the policy and rules database of the monitoring component comprise instructions operable to:

cryptographically authenticate a source of the command.

21. The non-transitory computer readable storage media of claim 15, further including instructions operable to:

log, by the monitoring component, the one or more transactions or data received from the at least one processor; and when it is determined that the one or more transactions or data are not authorized, send an alarm to an external device alerting the external device that at least one unauthorized transaction or data was received from the at least one processor.

22. The non-transitory computer readable storage media of claim 15, wherein the one or more policies include at least one of:

a policy permitting read transactions to the at least one controller by the at least one processor only during a particular period of time, a policy permitting read transactions but not write transactions to the at least one controller, and a policy permitting any transaction based on receipt of an appropriate cryptographic key.

* * * * *